(12) United States Patent
Kim et al.

(10) Patent No.: US 11,243,132 B2
(45) Date of Patent: Feb. 8, 2022

(54) PRESSURE SENSOR INCLUDING AN INTEGRATED POSITION DETERMINING MEMBER

(71) Applicant: Tyco Electronics AMP Korea Co., Ltd., Gyeongsansi-Si (KR)

(72) Inventors: Young Deok Kim, Gyeongsan-Si (KR); Won Jong Choi, Gyeongsan-Si (KR)

(73) Assignee: Tyco Electronics AMP Korea Co., Ltd., Gyeongsan-Si (KR)

(*) Notice: Subject to any disclaimer, the term of this patent is extended or adjusted under 35 U.S.C. 154(b) by 240 days.

(21) Appl. No.: 16/546,473

(22) Filed: Aug. 21, 2019

(65) Prior Publication Data

US 2019/0376865 A1    Dec. 12, 2019

Related U.S. Application Data

(63) Continuation of application No. PCT/KR2018/002158, filed on Feb. 22, 2018.

(30) Foreign Application Priority Data

Feb. 22, 2017  (KR) .................. 10-2017-0023500
Feb. 21, 2018  (KR) .................. 10-2018-0020527

(51) Int. Cl.
   *G01L 19/14*     (2006.01)
   *G01L 19/00*     (2006.01)
   *G01D 11/16*     (2006.01)

(52) U.S. Cl.
   CPC ........ *G01L 19/148* (2013.01); *G01L 19/0061* (2013.01); *G01D 11/16* (2013.01)

(58) Field of Classification Search
   None
   See application file for complete search history.

(56) References Cited

U.S. PATENT DOCUMENTS

| 6,364,292 B1 | 4/2002 | Chen et al. |
| 2008/0223142 A1* | 9/2008 | Iimori ............ G01L 19/148 73/726 |
| 2010/0018494 A1* | 1/2010 | Obermeier ...... G01L 9/0042 123/198 R |
| 2019/0100178 A1* | 4/2019 | Seo .......... B60T 13/662 |
| 2020/0173819 A1* | 6/2020 | Kern .......... G01F 15/185 |

FOREIGN PATENT DOCUMENTS

| KR | 20-0371255 Y1 | 12/2004 |
| KR | 10-2012-0077210 A | 7/2012 |
| KR | 10-2015-0145826 A | 12/2015 |
| KR | 10-2016-0053516 A | 5/2016 |

OTHER PUBLICATIONS

PCT Search Report and The Written Opinion, English translation of International Search Report, dated Jun. 18, 2018, 13 pages.

* cited by examiner

*Primary Examiner* — Andre J Allen
*Assistant Examiner* — Jermaine L Jenkins
(74) *Attorney, Agent, or Firm* — Barley Snyder (57) ABSTRACT

A pressure sensor includes a sensor element, an inner frame configured to receive at least a portion of the sensor element, and a housing configured to receive the inner frame therein. The inner frame is formed of a metal material and includes a printed circuit board assembly to be electrically connected to the sensor element. The housing is formed of a resin material.

18 Claims, 10 Drawing Sheets

PRESSURE SENSOR INCLUDING AN INTEGRATED POSITION DETERMINING MEMBER

CROSS-REFERENCE TO RELATED APPLICATIONS

This application is a continuation of PCT International Application No. PCT/KR2018/002158, filed on Feb. 22, 2018, which claims priority under 35 U.S.C. § 119 to Korean Patent Application No. 10-2017-0023500, filed on Feb. 22, 2017, and Korean Patent Application No. 10-2018-0020527, filed on Feb. 21, 2018.

FIELD OF THE INVENTION

The present invention relates to a pressure sensor and, more particularly, to a pressure sensor including a sensor element and a housing.

BACKGROUND

In general, a brake system is provided in a vehicle to reduce a speed of the vehicle or brake the vehicle. The brake system may include a pedal configured to transfer an operation force of a user, a booster and a master cylinder connected to the pedal and configured to form a brake pressure, and a wheel brake configured to brake a wheel of the vehicle based on the brake pressure input from the booster and the master cylinder.

In such a brake system, when a driver steps on a brake pedal and a braking force is generated, a tire of a vehicle may slip on a road in response to a frictional force generated in a wheel brake due to a brake pressure being greater than a braking force generated on the road. When a brake operates in such a case, a steering system may be locked and the vehicle may not steer in a desired direction.

An anti-lock brake system (ABS) is configured to electronically control a pedal effect of a brake to enable steering despite a slip. The ABS may include a plurality of solenoid valves configured to adjust a brake pressure to be transferred to a wheel brake, a hydraulic unit including a low-pressure accumulator and a high-pressure accumulator, and an electronic control unit (ECU) configured to control components that electrically operate. In addition, the hydraulic unit may include a pressure sensor configured to detect a brake operating pressure generated in a master cylinder in proportion to a brake pedal effect, and transfer the detected brake operating pressure as an electrical signal to the ECU. The ECU may then control an operation of the brake based on the electrical signal transferred from the pressure sensor.

A typical pressure sensor may be mounted on a machining hole formed at a front end of a master cylinder and electrically connected to a circuit board of the ECU through a separate connector and a cable. When the braking force is generated due to a pedal force of the driver, the pressure sensor may be moved by a minute vibration. In this example, the pressure sensor may be elastically pressed by a connection terminal to be electrically connected to the circuit board. However, when a large vibration is input, the typical pressure sensor may be separated from the circuit board of the ECU. A connection between terminals of the circuit board may not be correctly performed, which may also cause a contact failure; in this case, a signal and a power source may be destabilized. In addition, the typical pressure sensor includes a plurality of parts, a size of the pressure sensor is relatively small, and thus, a component assembly process may be complicated. Further, the pressure sensor is a precision part that requires an accurate assembly, however, as a number of components increases, defects may occur in a manufacturing process. Pressure sensors typically require significant manufacturing cost.

SUMMARY

A pressure sensor includes a sensor element, an inner frame configured to receive at least a portion of the sensor element, and a housing configured to receive the inner frame therein. The inner frame is formed of a metal material and includes a printed circuit board assembly to be electrically connected to the sensor element. The housing is formed of a resin material.

BRIEF DESCRIPTION OF THE DRAWINGS

The invention will now be described by way of example with reference to the accompanying Figures, of which.

DETAILED DESCRIPTION OF THE EMBODIMENT(S)

Hereinafter, exemplary embodiments will be described in detail with reference to the accompanying drawings. It should be understood, however, that there is no intent to limit this disclosure to the particular example embodiments disclosed. On the contrary, example embodiments are to cover all modifications, equivalents, and alternatives. The accompanying drawings, which are incorporated in and constitute a part of the specification, illustrate example embodiments of the disclosure and, together with the description, serve to further the understanding of the technical idea of the disclosure; the disclosure is not limited to the shown embodiments.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

A pressure sensor 10 according to an embodiment will be described in detail with reference to FIGS. 1A-5. In an embodiment, the pressure sensor 10 is adapted for a vehicle. The pressure sensor 10 comprises a sensor element 11, an inner frame 12 including a printed circuit board (PCB) assembly 121, and a housing 13. The inner frame 12 formed with a metal material may be soldered to the PCB assembly 121 and the sensor element 11. The inner frame 12 formed with the metal material and the housing 13 formed with a resin material are mechanically fastened.

In the following description, the sensor element 11, the inner frame 12, and the housing 13 may be sequentially connected. Along the connection direction, a side corresponding to the sensor element 11 may be referred to as "lower portion" or "lower side" and a side corresponding to the housing 13 may be referred to as "upper portion" or "upper side".

Figure 2:
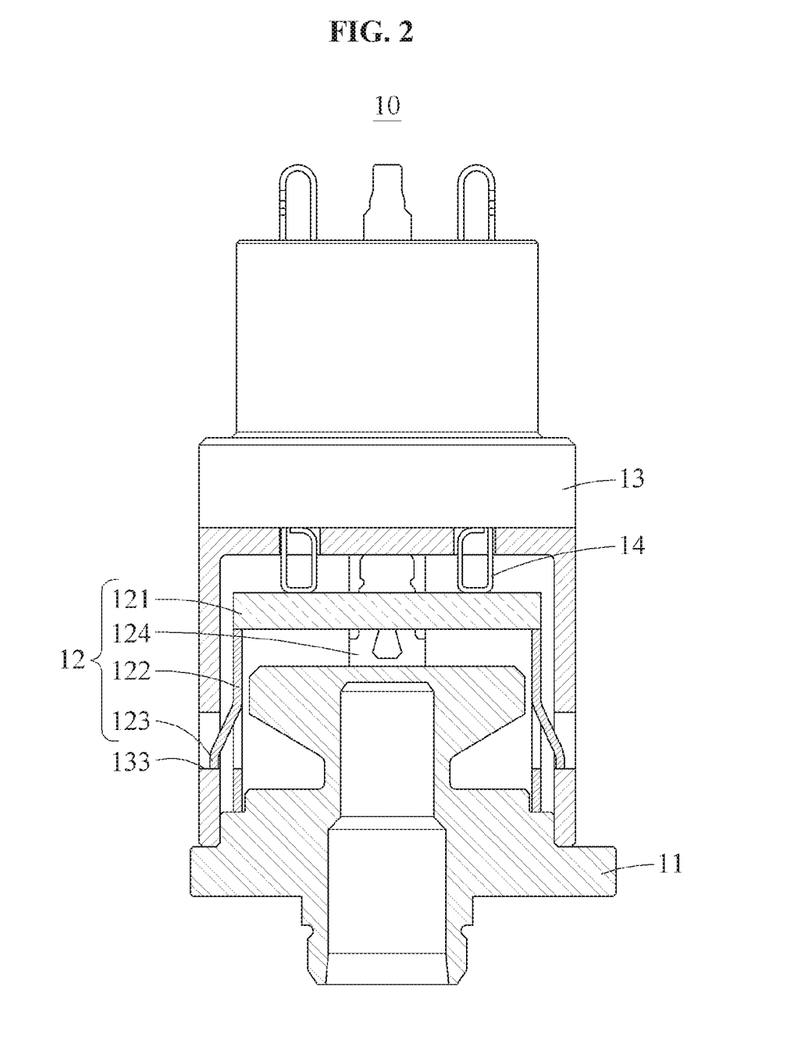
FIG. 2 is a sectional front view of the pressure sensor taken along line II-II of FIG. 1A.

Various sensor gauges (not shown) may be attached to the sensor element 11 to sense a pressure. An end portion (hereinafter, referred to as "upper end portion") to which the sensor gauge is attached may be electrically connected to the PCB assembly 121. The PCB assembly 121 and the sensor element 11 may be electrically connected through the inner frame 12, as shown in FIG. 2.

Figure 5:
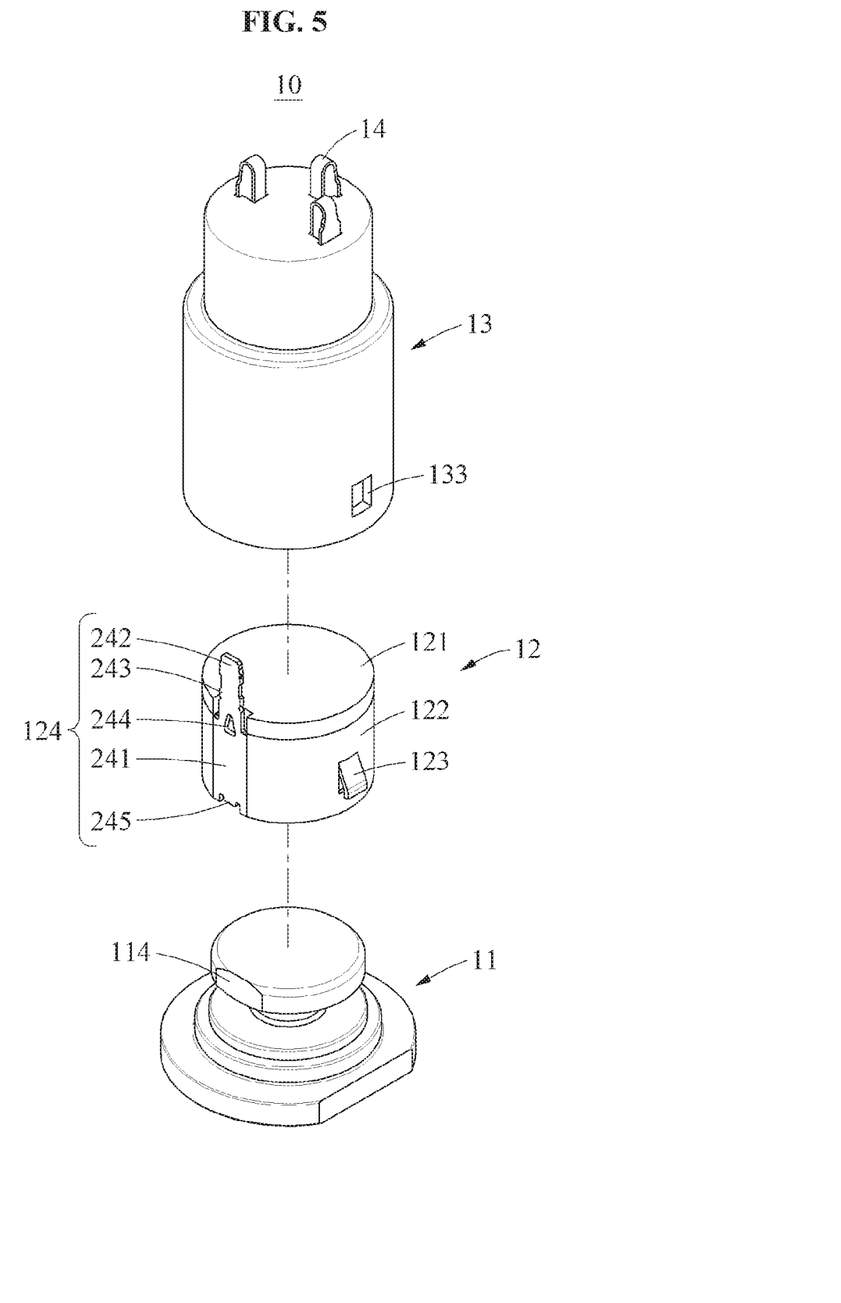
FIG. 5 is an exploded perspective view of the pressure sensor of FIG. 1A.

A portion of an outer surface of the sensor element 11 may be chamfered so as to be formed into a chamfered portion 114, as shown in FIG. 5. The chamfered portion 114 may be a portion to which a jig (not shown) is coupled when the sensor element 11 is attached to or detached from the inner frame 12. The chamfered portion 114 may function to align a position to which the inner frame 12 is connected when the sensor element 11 is attached to the inner frame 12. For example, the chamfered portion 114 may be formed at a position corresponding to a position determining member 124 described later.

The inner frame 12 may be formed of a metal material, formed in a cylindrical shape to receive an upper portion of the sensor element 11, and include the PCB assembly 121 in an upper portion, as shown in FIGS. 2-5. The inner frame 12 may have a cylindrical outer circumferential surface 122 which supports a bottom of the PCB assembly 121 and forms a space for receiving the sensor element 11. The inner frame 12 has a cylindrical shape in the shown embodiment. In other embodiments, a cross-sectional shape of the inner frame 12 may vary, including a polygonal prism shape. The inner frame 12 may be formed of the metal material so as to electrically connect the PCB assembly 121 and the sensor element 11. In addition, the inner frame 12 may function to ground the PCB assembly 121. Because the inner frame 12 is formed with the metal material and has the cylindrical shape in the shown embodiment, the inner frame 12 may support the PCB assembly 121 at a predetermined strength or greater.

In an embodiment, a solder paste (not shown) may be provided on a lower surface of the PCB assembly 121 at a portion corresponding to the upper end portion of the inner frame 12, so that the inner frame 12 is soldered and electrically connected to the PCB assembly 121. Also, a lower end portion of the inner frame 12 and the sensor element 11 may be soldered and electrically connected.

Figure 3:
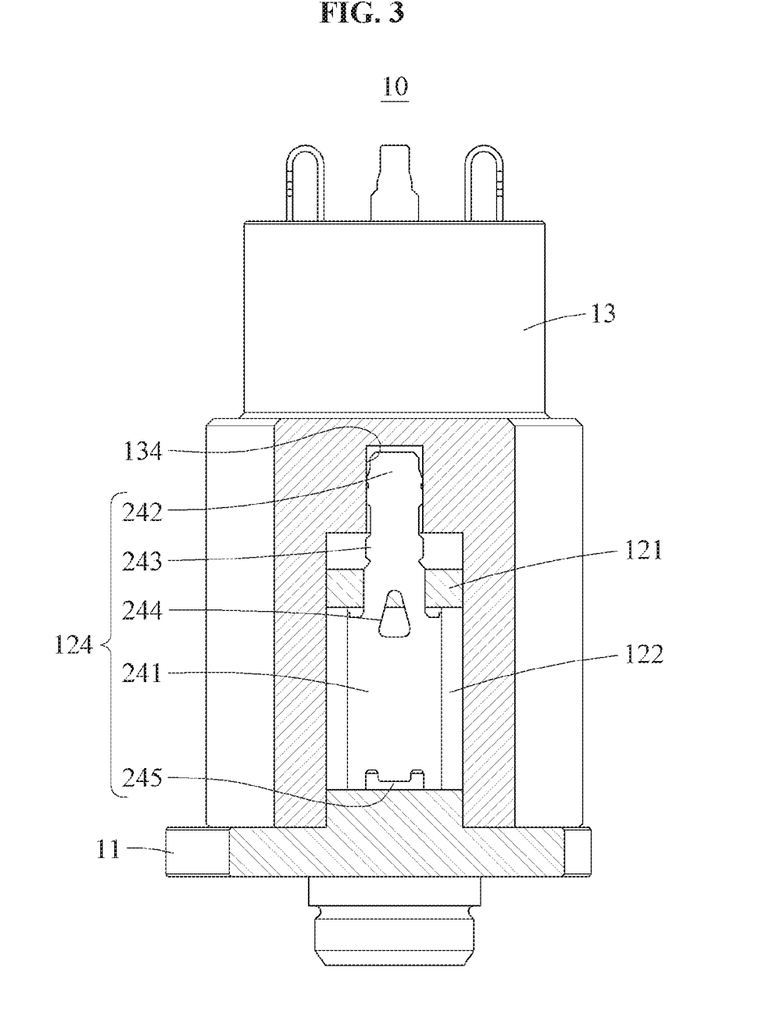
FIG. 3 is a sectional front view of the pressure sensor taken along line of FIG. 1A.

The inner frame 12, as shown in FIGS. 2, 3, and 5, may include a locking portion 123 to be coupled with the housing 13 and the position determining member 124. The housing 13 may have a locking hole 133 to which the locking portion 123 is coupled and a receiver 134 in which the position determining member 124 is received. The locking hole 133 and the receiver 134 will be further described later. A plurality of locking portions 123 may be provided along a perimeter of the outer circumferential surface 122 of the inner frame 12. The locking portion 123 may be a resiliently deformable elastic piece to be resiliently connected to the housing 13, and may have a shape of a hook that outwardly protrudes from the outer circumferential surface 122 in a predetermined length. The protruding portion of the locking portion 123 may be resiliently connected to the housing 13 and fix the inner frame 12 to be prevented from separating from the housing 13.

The locking portion 123, as shown in FIGS. 2 and 5, may be formed integrally with the outer circumferential surface 122. For example, the locking portion 123 may be formed by cutting a portion of the outer circumferential surface 122. The cut portion may outwardly protrude from the outer circumferential surface 122 and be bent in a predetermined shape. Since the locking portion 123 is formed with the metal material and bent in a predetermined shape, the locking portion 123 may have an elasticity and be elastically deformable due to the material and the shape. In an embodiment, the locking portion 123 may be formed to be inclined such that a distance from the outer circumferential surface 122 of the inner frame 12 increases toward a rear side along a direction in which the inner frame 12 is connected to the housing 13. In other embodiments, a shape and a size of the locking portion 123 are not limited to the present example and may vary.

Two locking portion 123 may be formed at positions facing each other on the outer circumferential surface 122, as shown in FIG. 2, such that the inner frame 12 is stably fixed to the housing 13. In other embodiments, a number of locking portions 123 is not limited thereto and at least three locking portions may be provided along a perimeter of the outer circumferential surface 122 of the inner frame 12. Also, the locking portions 123 may be provided on the outer circumferential surface 122 of the inner frame 12 at the same height or different heights.

The position determining member 124, as shown in FIG. 5, may be provided on one side of the outer circumferential surface 122 of the inner frame 12. In this embodiment, a protrusion 242 may protrude upward from an upper surface of the PCB assembly 121. The position determining member 124 may include a body 241 having a metal plate or bar, the protrusion 242 that protrudes upward from the inner frame 12, and a sensor element-side connected end portion 245 that is connected to a side of the sensor element 11 corresponding to a lower end portion. A caught portion 243 may outwardly protrude in a longitudinal direction in a portion connecting the position determining member 124 and the receiver 134. The caught portion 243 may keep the inner frame 12 and the housing 13 fastened.

The position determining member 124 may be provided on the outer circumferential surface 122 of the inner frame 12, as shown in FIG. 5. In an embodiment, the position determining member 124 may be formed integrally with the outer circumferential surface 122 of the inner frame 12. In this embodiment, a portion of a circumference of the position determining member 124 may protrude upwardly. In other embodiments, the position determining member 124 may be formed as a separate element from the inner frame 12, and may be formed on the outer circumferential surface 122 or to be attached to a perimeter of the outer circumferential surface 122.

The position determining member 124 may align a position when the inner frame 12 is inserted to the housing 13. In addition, the position determining member 124 may function as an insertion sensor that senses whether the inner frame 12 is inserted in the housing 13 based on a state in which the protrusion 242 is inserted in the receiver 134 of the housing 13. The position determining member 124 is formed to verify whether the inner frame 12 is inserted in the housing 13. In the state in which the protrusion 242 is inserted in the receiver 134, the position determining member 124 may function to fix the inner frame 12 and the housing 13.

When the inner frame 12 is inserted to the housing 13, the protrusion 242 of the position determining member 124 may be inserted into the receiver 134 as shown in FIG. 3 such that a position of the inner frame 12 is determined and fixed primarily. Whether the inner frame 12 is coupled to a right position of the housing 13 may be determined by the position determining member 124. When the inner frame 12 is further inserted into the housing 13, the locking portion 123 may be fit into the locking hole 133, so that the inner frame 12 and the housing 13 are fixed secondarily and a fixed state is maintained. The position determining member 124 may be secured to the housing 13 through an interference engagement as the caught portion 243 presses an inner surface of the receiver 134 of the housing 13.

Figure 4:
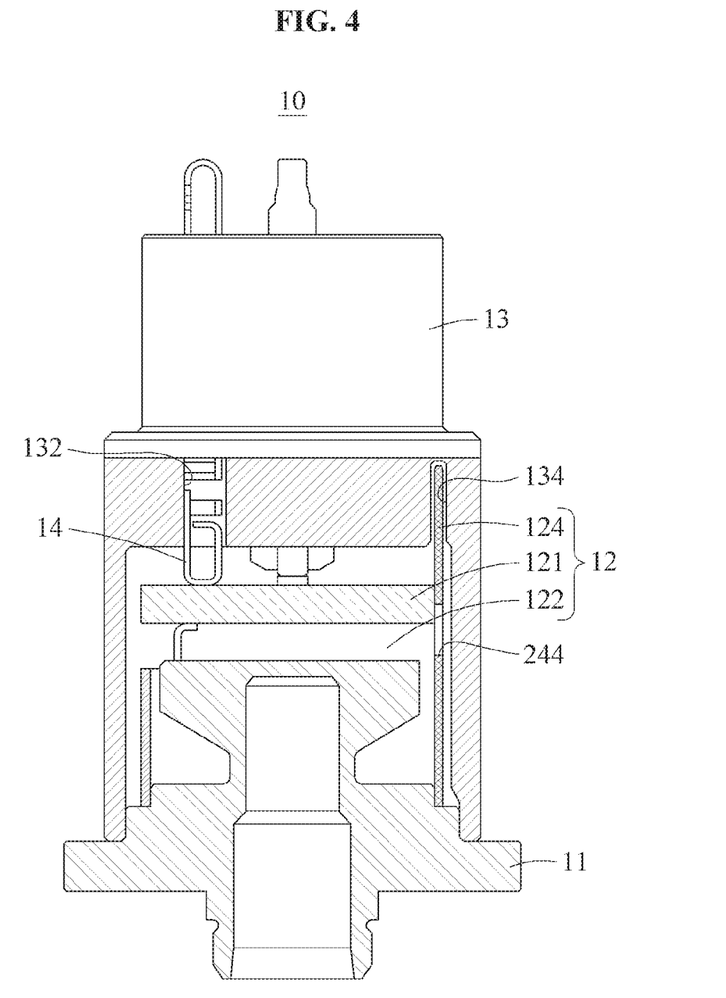
FIG. 4 is a sectional front view of the pressure sensor taken along line IV-IV of FIG. 1B.

In the position determining member 124, as shown in FIGS. 4 and 5, a load reducer 244 may be formed in a predetermined size in a middle of the body 241 along a longitudinal direction. The load reducer 244 may be a hole penetrating the position determining member 124. Also, the load reducer 244 may be formed at a position corresponding to a side surface of the PCB assembly 121 along the longitudinal direction of the position determining member 124. In other embodiments, a position, a shape, and a size of the load reducer 244 may vary.

When an unexpected load is applied from an outside of the housing 13, the load may be distributed around the load reducer 244. As such, the load reducer 244 may prevent an external load from being delivered from the sensor element 11 through the position determining member 124. Here, the external load may refer to, for example, a load or a pressure/stress generated by a torsional load or an external vibration occurring when the housing 13 is vertically twisted with respect to the inner frame 12.

Figure 1A:
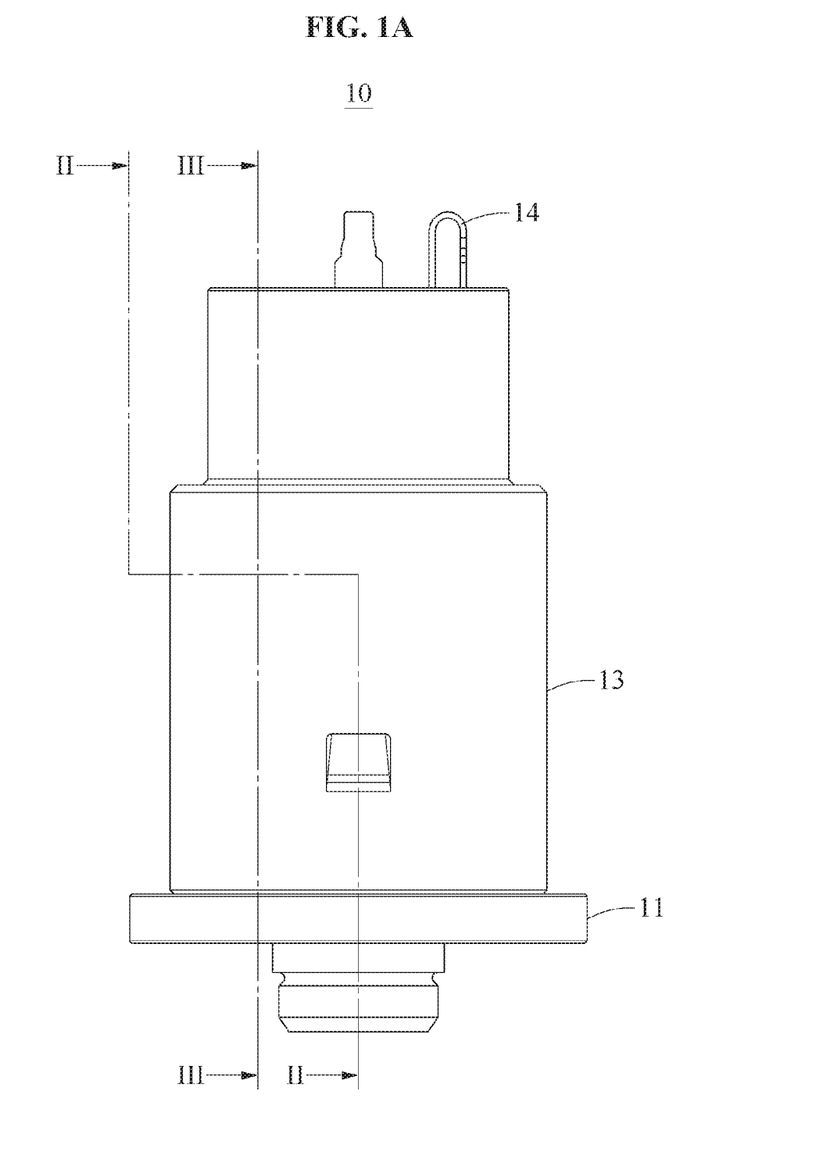
FIG. 1A is a front view of a pressure sensor according to an embodiment.
Figure 1B:
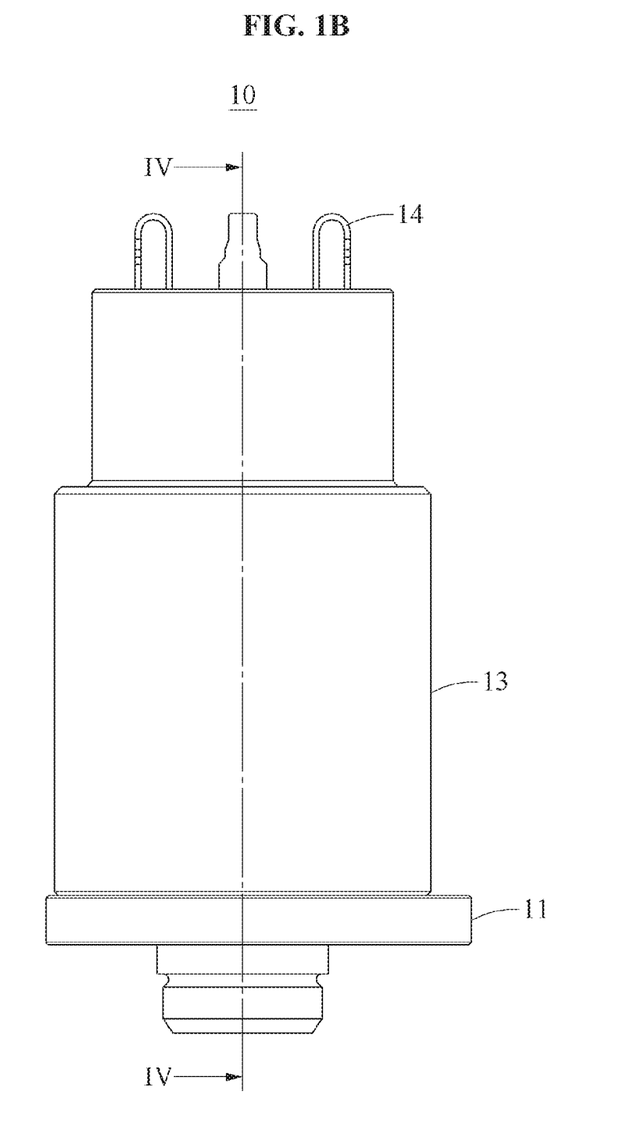
FIG. 1B is another front view of the pressure sensor of FIG. 1A rotated 90 degrees.

The housing 13 may be formed with a resin material and form an appearance of the pressure sensor 10 by accommodating the sensor element 11 and the inner frame 12, as shown in FIGS. 1A and 1B. The housing 13 may be in a shape of a container to accommodate the inner frame 12. In an embodiment, the housing 13 may be formed in a shape of a container having a cross section corresponding to the inner frame 12. In other embodiments, the shape of the cross section of the housing 13 may vary in various ways, including a polygonal prism shape.

The housing 13, as shown in FIGS. 1A-2, may be integrally provided with at least one connection terminal 14 that is electrically connected to the PCB assembly 121. Here, "integrally provided" does not necessarily mean that the housing 13 and the connection terminal 14 are made of a single material. The connection terminal 14 having the metal material may be simply inserted in the housing 13 having the resin material in a molding process, so that the housing 13 is integrally provided with the connection terminal 14. The connection terminal 14 may be provided with the housing 13 in various ways.

The housing 13 may function as a holder for holding and supporting the connection terminal 14 and as a cover for internal components. The housing 13 may support the connection terminal 14 to be elastically deformable and movable such that the connection terminal 14 is stable connected to the PCB assembly 121. For example, the connection terminal 14 may penetrate an upper surface of the housing 13, as shown in FIG. 2, and have one end protruding from an inner surface of the housing 13 so as to be electrically connected to the PCB assembly 121 and the other end outwardly protruding from the upper surface of the housing 13. Here, the connection terminal 14 may have at least an elastically deformable portion protruding from an inner side.

A number and an arrangement of connection terminals 14 may be determined based on a circuit pattern of the PCB assembly 121. Although three connection terminal 14 are shown in the embodiment of FIG. 5, in other embodiments, the number and the arrangement of connection terminals 14 may vary.

The locking hole 133 into which the locking portion 123 is fit may be formed along an outer circumferential surface of the housing 13, as shown in FIGS. 2 and 5. The locking hole 133 may penetrate the housing 13. In this embodiment, when the locking portion 123 is pressed from the outside of the housing 13 through the locking hole 133, the locking portion 123 may be separated from the locking hole 133, so that the inner frame 12 is detached from the housing 13.

In the shown embodiment, the housing 13 may be formed with the resin material to simplify a structure of the housing 13, simplify a manufacturing process, and reduce costs. Because the housing 13 is formed integrally with the connection terminal 14, the structure may be simplified.

An assembling process of assembling the pressure sensor 10 will now be described in greater detail.

First, the upper end portion of the inner frame 12 and a portion corresponding thereto may be soldered and coupled to each other.

A portion of the sensor element 11 may be inserted into the lower end portion of the inner frame 12, and then the lower end portion of the inner frame 12 and the portion of the sensor element 11 corresponding thereto may be soldered and coupled to each other.

Thereafter, an assembly in which the inner frame 12, the PCB assembly 121, and the sensor element 11 are connected may be inserted into the housing 13.

After aligning positions of the inner frame 12 and the housing 13 using the position determining member 124, the inner frame 12 may be inserted so that the protrusion 242 of the position determining member 124 is inserted into the receiver 134 located inside the housing 13, as shown in FIG. 3. The locking portion 123 of the inner frame 12 may be inserted into the locking hole 133 until the locking portion 123 is completely fit into the locking hole 133.

When the inner frame 12 is inserted in the housing 13, the housing 13 may accommodate both the inner frame 12 and the sensor element 11, as shown in FIGS. 1A-4, so that the assembly of the pressure sensor 10 is completed.

Because the inner frame 12 having the metal material and the housing 13 having the resin material are mechanically coupled, it is easy to be assembled, disassembled, and processed. The housing 13 may function as a cover that forms the appearance of the pressure sensor 10 and protect the PCB assembly 121 and as a terminal guide that fixes the connection terminal 14. The pressure sensor 10 may reduce a number of components and reduce a production and assembly process of the pressure sensor 10 when compared to the typical pressure sensor. In addition, because the housing 13 is formed with the resin material, the structure and the manufacturing process of the housing 13 may be simplified. The inner frame 12 formed with the metal material may be electrically connected to the PCB assembly 121 and the sensor element 11, thereby functioning as a ground. Also, because the inner frame 12 is formed integrally with the PCB assembly 121, the PCB assembly 121 may be stably supported.

In another embodiment, shown in FIGS. 6-9, the pressure sensor 10 includes a closing member 15 for the housing 13. The embodiment described below with reference to FIGS. 6-9 is the same as the embodiment described with reference to FIGS. 1A-5 except for the closing member 15. The same names and reference numerals are used for the same constituent elements, and redundant explanations for constituent elements other than the differences are omitted.

As shown in FIGS. 6-9, the pressure sensor 10 may include the sensor element 11, the inner frame 12 coupled to the PCB assembly 121, and the housing 13. The pressure sensor 10 includes the closing member 15 for the housing 13.

Figure 6:
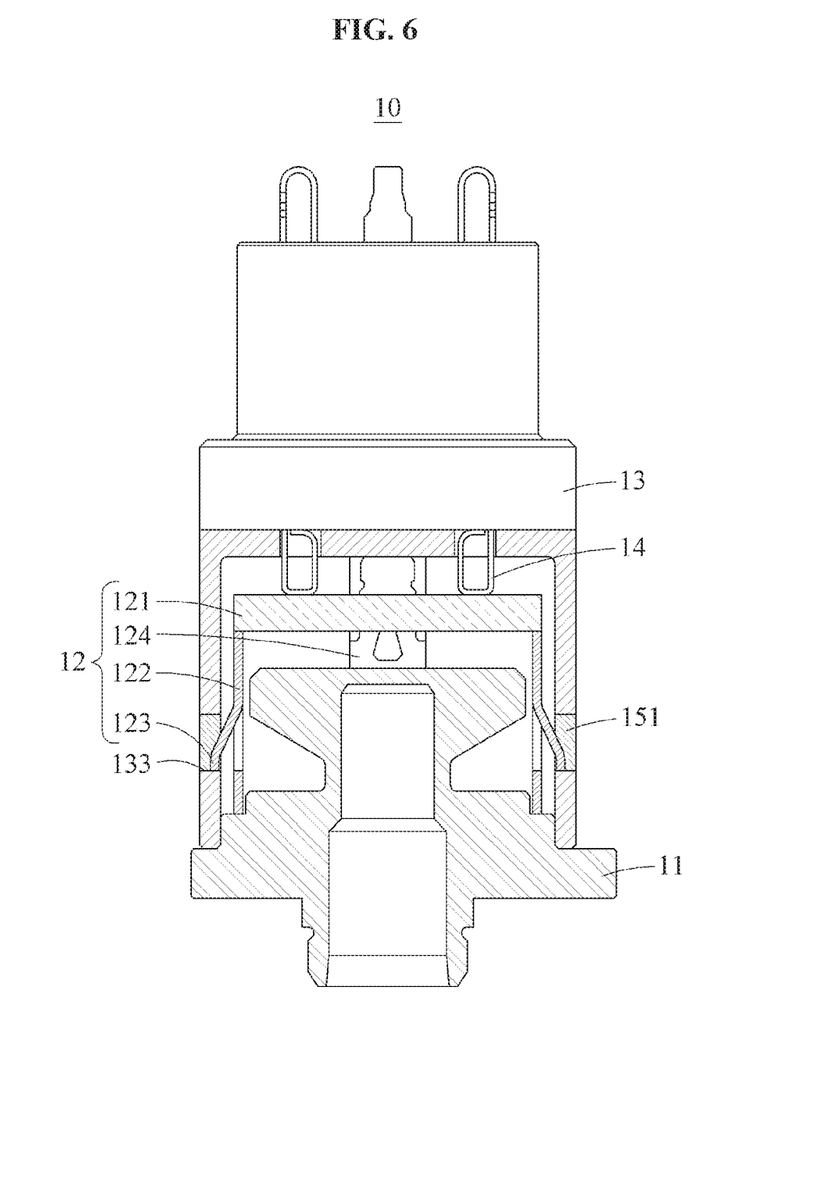
FIG. 6 is a sectional front view of a pressure sensor according to another embodiment, corresponding to the view shown in FIG. 2.
Figure 7:
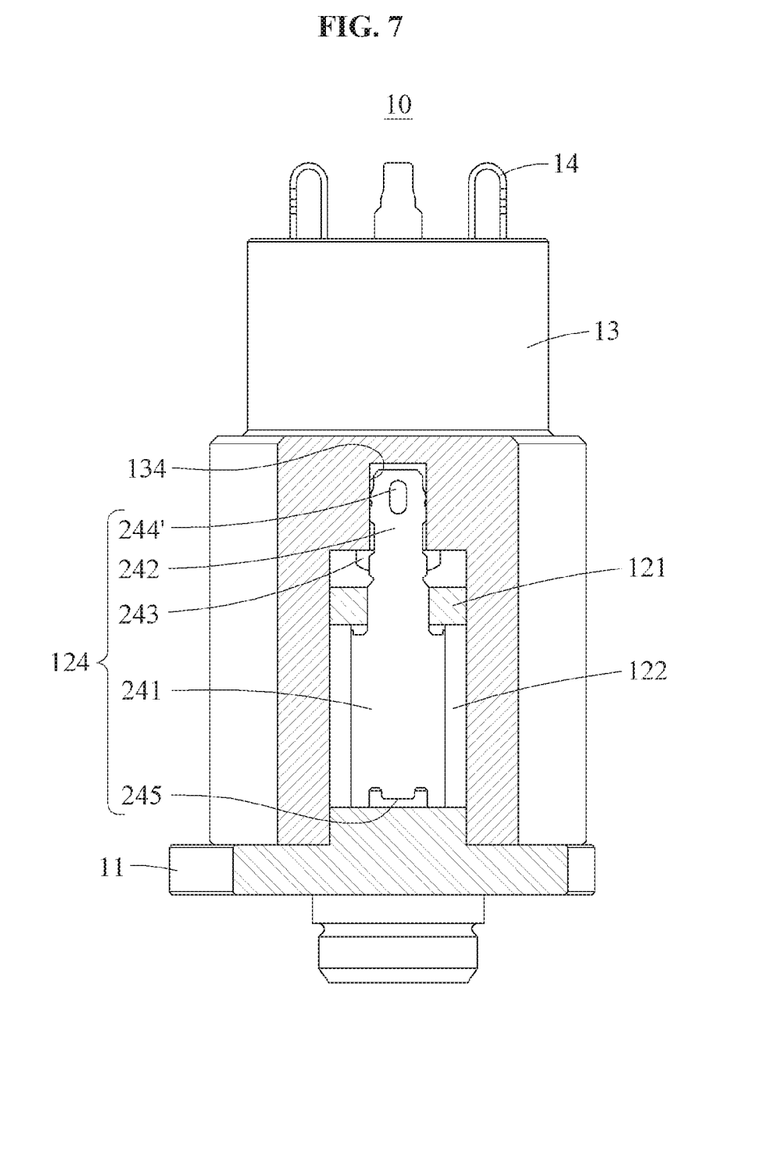
FIG. 7 is another sectional front view of the pressure sensor of FIG. 6, corresponding to the view shown in FIG. 3.
Figure 8:
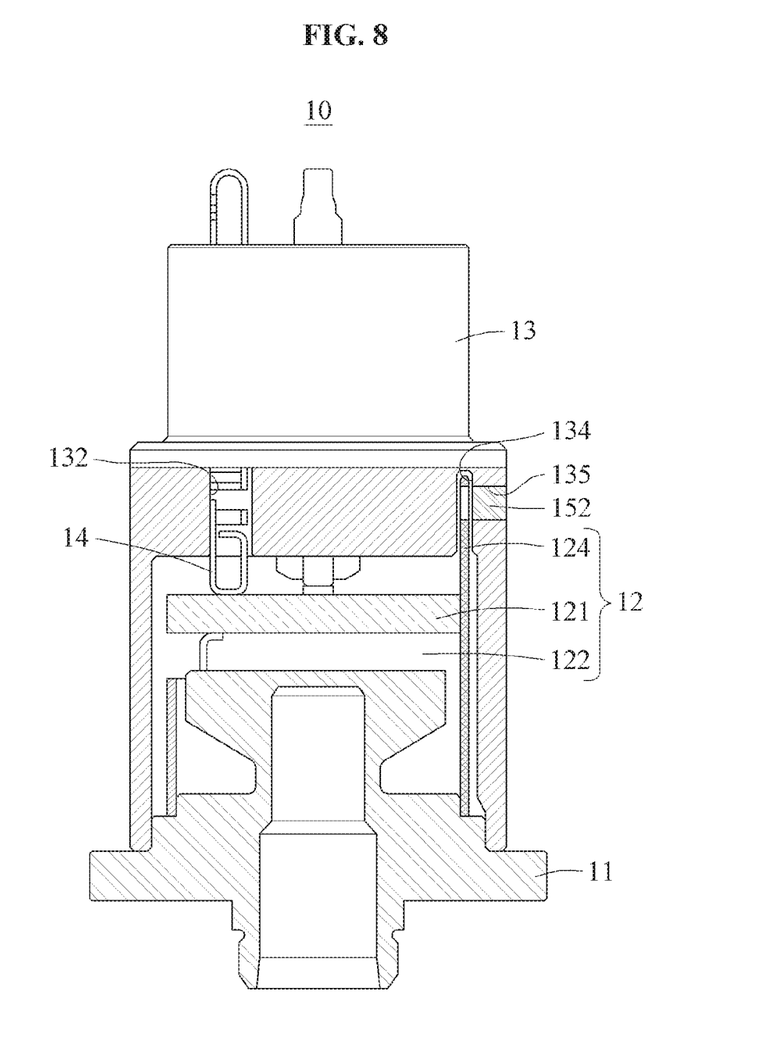
FIG. 8 is another sectional front view of the pressure sensor of FIG. 6, corresponding to the view shown in FIG. 4.
Figure 9:
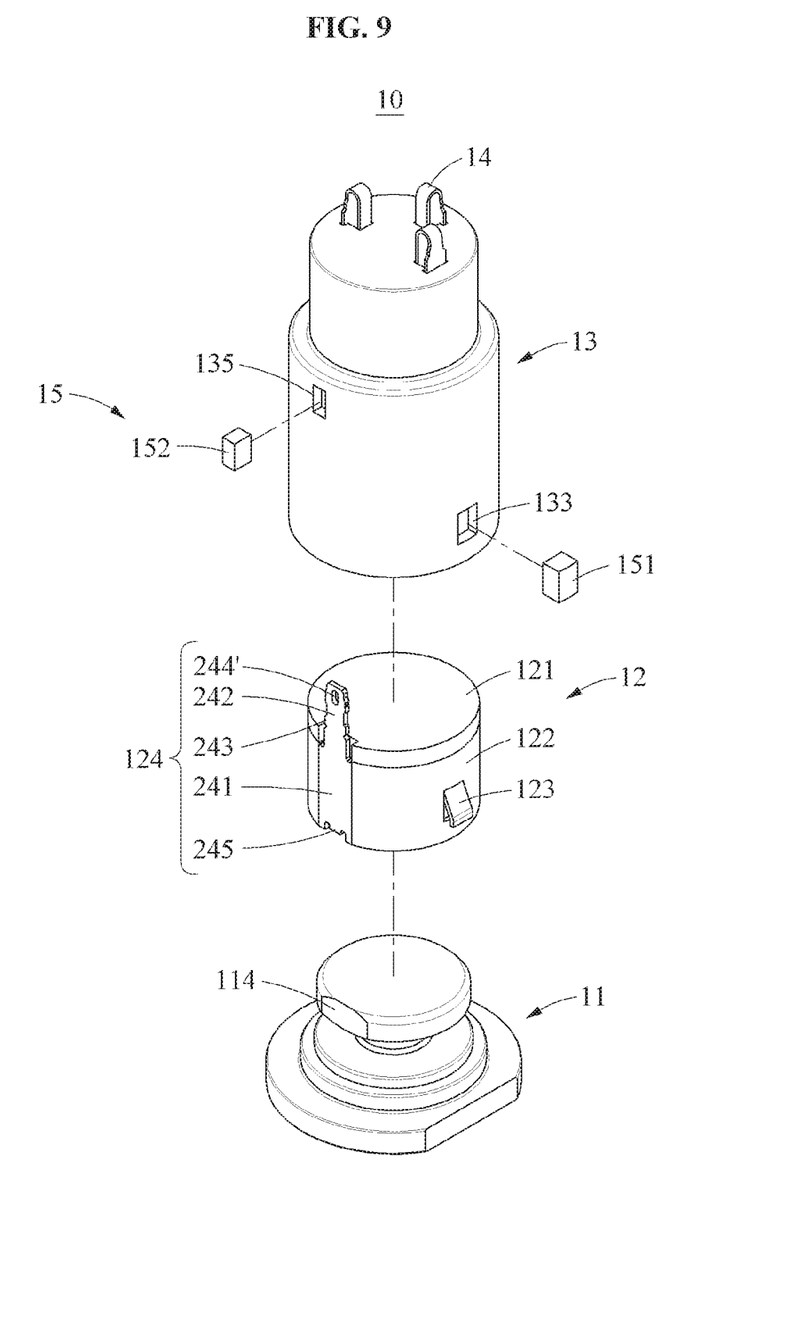
FIG. 9 is an exploded perspective view of the pressure sensor of FIG. 6.

As shown in FIGS. 6-9. the inner frame 12 may be formed with a metal material, formed in a shape of a container, and supports the PCB assembly 121. The inner frame 12 may have a plurality of locking portions 123 on the outer circumferential surface 122 and have the position determining member 124 on one side. The locking portion 123 may have a shape of a hook that outwardly protrudes from the outer circumferential surface 122 in a predetermined length and is mechanically coupled to the locking hole 133 of the housing 13. The position determining member 124 may be provided on an outer side of the inner frame 12 and formed to protrude upward from the PCB assembly 121 in a predetermined length. The position determining member 124 may include a load reducer 244', as shown in FIGS. 6 and 9, at a position close to an upper end portion of the protrusion 242.

The housing 13 may have a shape of a container for accommodating the sensor element 11 and the inner frame 12, as shown in FIGS. 6-8, and is formed with a resin material. The housing 13 may be integrally provided with at least one connection terminal 14 electrically connected to the PCB assembly 121. The connection terminal 14 may have one end protruding from the inner side of the housing 13 in a predetermined length and the other end outwardly protruding from the upper surface of the housing 13, as shown in FIG. 6.

In the housing 13, the locking hole 133 may be formed at a position corresponding to the locking portion 123 to penetrate the housing 13, as shown in FIGS. 6 and 9. A second locking hole 135 may be formed at a position corresponding to the load reducer 244' of the position determining member 124 to penetrate the housing 13.

The closing member 15, shown in FIGS. 6, 8, and 9, may be formed and provided to fill the locking hole 133 and the second locking hole 135 of the housing 13. The closing member 15 may be potted or filled with a predetermined material in order to close open portions of the locking hole 133 and the second locking hole 135. In an embodiment, the closing member 15 may be formed with a silicone or a resin material and include a first closing member 151 and a second closing member 152 to fill the locking hole 133 and the second locking hole 135, respectively. The second closing member 152 may be formed to fill both the second locking hole 135 and the load reducer 244'. The second closing member 152 may be formed to fill at least a portion of an inner space of the receiver 134 receiving a connection terminal in the housing 13. Because the silicone or resin filled in the locking hole 133 and the second locking hole 135 functions as an adhesive, the closing member 15 may fix the locking portion 123 to the locking hole 133, fix the position determining member 124 to the second locking hole 135, and firmly maintain the fixed state.

As shown in FIGS. 6, 8, and 9, a blocking portions 151 and 152 may be formed with a hermetic/watertight material, so as to prevent external moisture or foreign substances from entering through the locking hole 133 and the second locking hole 135.

In the shown embodiments, the closing member 15 may fill holes (the locking hole 133 and the second locking hole 135) formed in the housing 13 and include the resin material for adhering and fixing the housing 13, thereby firmly fixing the inner frame 12 to the housing 13. In addition, the closing member 15 may close the hole of the housing 13 to effectively prevent external moisture or foreign substances from entering the pressure sensor 10 from the outside of the housing 13.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A pressure sensor, comprising:
   a sensor element;
   an inner frame configured to receive at least a portion of the sensor element, the inner frame formed of a metal material and including a printed circuit board assembly to be electrically connected to the sensor element, the inner frame having a position determining member disposed on a side of the inner frame and configured to determine a position of the inner frame; and a housing configured to receive the inner frame therein and formed of a resin material, the housing being mechanically coupled to the inner frame.

2. The pressure sensor of claim 1, wherein the inner frame has a locking portion protruding outwardly from a side of an outer circumferential surface of the inner frame.

3. The pressure sensor of claim 2, wherein the housing has a locking hole to be connected to the locking portion.

4. The pressure sensor of claim 3, wherein the locking portion is formed integrally with the inner frame and at least a portion of the locking portion is elastically deformable.

5. The pressure sensor of claim 4, wherein the locking portion is formed by cutting a portion of the outer circumferential surface of the inner frame.

6. The pressure sensor of claim 5, wherein the locking portion is inclined, a distance between the locking portion and the outer circumferential surface of the inner frame increases toward a rear side of the inner frame along a direction in which the inner frame is connected to the housing.

7. The pressure sensor of claim 3, wherein the locking hole extends through the housing.

8. The pressure sensor of claim 7, further comprising a closing member configured to close the locking hole.

9. The pressure sensor of claim 8, wherein the closing member is filled with a silicone or a resin material.

10. The pressure sensor of claim 1, wherein the housing has a receiver in which a protruding portion of the position determining member is received and fixed.

11. The pressure sensor of claim 10, wherein the position determining member is formed to verify whether the inner frame is inserted in the housing.

12. The pressure sensor of claim 10, wherein the position determining member presses and fixes an inner surface of the receiver.

13. The pressure sensor of claim 10, wherein the position determining member is a metal plate coupled to an outer circumferential surface of the inner frame.

14. The pressure sensor of claim 10, wherein the position determining member is formed integrally with an outer circumferential surface of the inner frame.

15. The pressure sensor of claim 14, wherein at least a portion of the position determining member protrudes upward from an upper surface of the inner frame.

16. The pressure sensor of claim 1, wherein the position determining member has a load reducer in a protruding portion in which the position determining member is inserted into the housing.

17. The pressure sensor of claim 16, wherein the housing has a locking hole at a position corresponding to the load reducer, a closing member is provided to close the locking hole.

18. The pressure sensor of claim 17, wherein the closing member fills a hole of the position determining member and the locking hole.

* * * * *